April 18, 1939.   H. A. GREEN   2,155,011
GLUING DEVICE
Filed Feb. 19, 1937
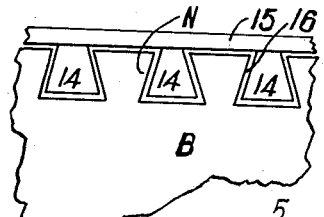
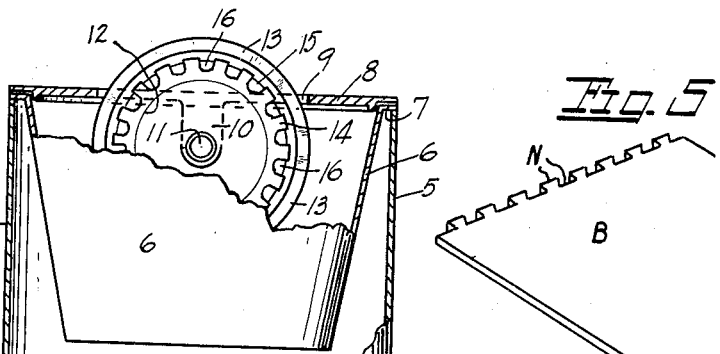
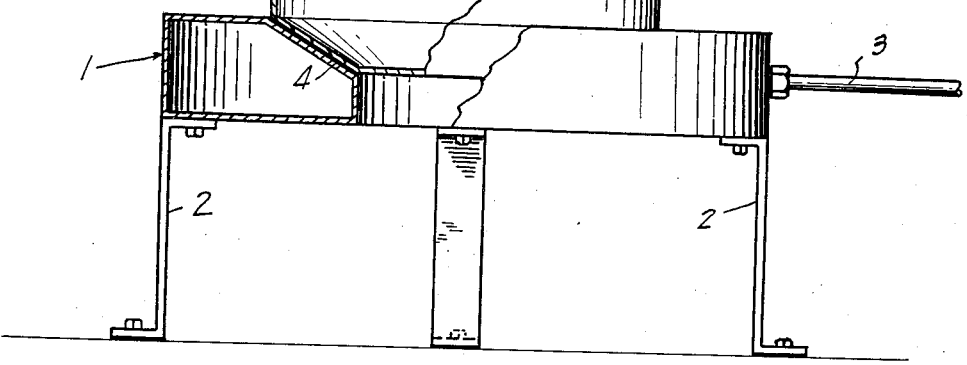
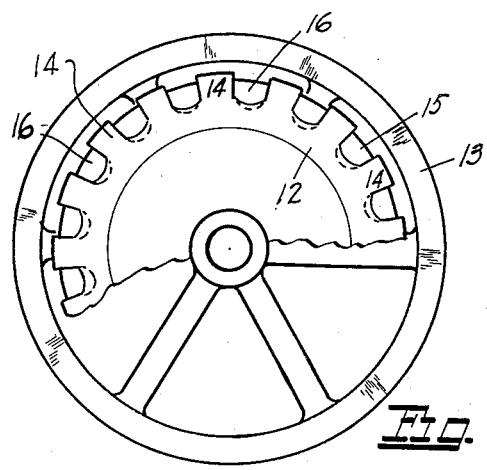
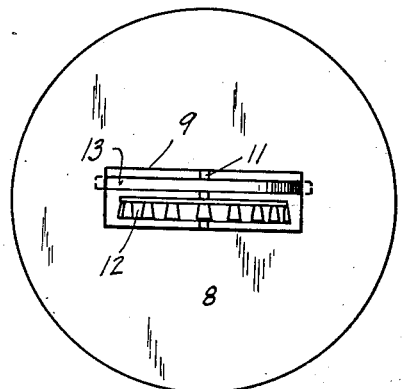
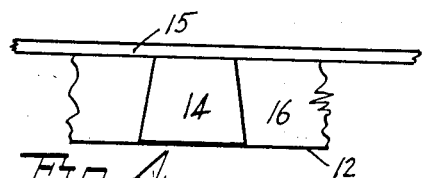
HARRY A. GREEN
INVENTOR.
BY James D. Livnan
ATTORNEYS.

Patented Apr. 18, 1939

2,155,011

UNITED STATES PATENT OFFICE 2,155,011

GLUING DEVICE

Harry A. Green, Portland, Oreg.

Application February 19, 1937, Serial No. 126,723

4 Claims. (Cl. 144—280)

This invention relates to improvements in gluing devices and has for its principal object to provide a device of this character by means of which glue may be quickly and efficiently applied to dovetail grooves in the sides or edges of wooden panels, such as are used in the manufacture of furniture, the side and end walls of drawers therefor, box panels and the like.

A further object of the invention is the provision of means whereby glue may be applied, as aforesaid, cleanly, evenly, with a minimum of waste, and a minimum amount of time on the part of the operator.

Still another object is the provision of a device of this character which is of simple, efficient, durable and inexpensive construction, wherein the several parts are readily accessible and may be readily disassembled for cleaning purposes and the like.

These and other objects will appear as my invention is more fully hereinafter described in the following specification, illustrated in the accompanying drawing, and finally pointed out in the appended claims.

In the drawing:

Figure 1 is a side elevation of the device with parts broken away for convenience of illustration.

Figure 2 is a top plan view of a glue pot coverplate showing the glue-applying members rotatably mounted thereon.

Figure 3 is an enlarged side elevation of the glue-applying means with one of them partly broken away for purposes of illustration.

Figure 4 is an enlarged fragmentary edgewise view of a portion of the periphery of one of the rotatable glue-applying members.

Figure 5 is a detail view of a wooden panel formed with a dovetail edge with which one of the rotatable glue-applying members is adapted to engage.

Figure 6 is an enlarged fragmentary detail view illustrating the manner in which the dovetail or notched edge of a board may be meshed with one of the glue applying wheels for rotating the same.

Referring in detail to the drawing, reference numeral 1 indicates a steam chamber preferably of circular formation and supported upon suitable legs 2. A steam supply line 3 connects the steam chamber with a source of steam supply which may be regulated by any suitable valve. The center of the steam chamber is formed with an annular inclined portion 4 to form a seat for a water chamber 5 whose bottom wall is shaped to correspond with the seat 4. A glue pot 6 is disposed within the water chamber. The top edge of the glue pot is flanged outwardly, as at 7, to support itself on the top edge of the water chamber. A coverplate 8 is provided for the glue pot. The coverplate is formed with an elongated slot 9. Bearing brackets 10 are formed integral with the under side of the coverplate and extend downwardly therefrom. A shaft 11 is journaled in the bearings. To the shaft I secure a pair of glue-applying wheels 12 and 13 which rotate in unison. The bearings 10 are so arranged with respect to the coverplate that the major portion of both wheels are submerged in the glue contained in the glue pot, and so that only a portion of the periphery of each wheel is exposed above the coverplate, substantially as shown in Figure 1.

In operation, the water chamber 5 is filled with water which is maintained in a heated condition by partaking of the heat from the steam chamber 1. The glue pot 6 being submerged in the hot water maintains the glue in a liquid condition.

The wheel 13 is formed with a smooth rim as shown and is adapted to apply glue only to the straight smooth edges or surfaces of pieces to be glued together. The wheel 12, adapted to apply glue only to dovetail or notched edges N in a board B (see Figures 5 and 6) is formed with teeth 14 around its periphery and the back face of the wheel is provided with a flange 15 to form a back-wall between the teeth. The spaces between the teeth thereby serve as cups or buckets 16 for conveying a maximum amount of glue over the top of the wheel 12, as it is rotated, for applying the glue to the dovetail or notched surface along the edge of the board as it passes through the teeth 14. As shown in Figure 1 the major portions of both wheels are immersed in the glue, as they are rotated the entire exposed surfaces of the wheels become completely covered. For applying the glue to the smooth surfaces of a board or the like, it is merely necessary to bring the board into rolling contact with the periphery of the wheel 13. For applying the glue to a dovetail or notched edge of a board the notches therein are brought into mesh with the teeth 14 of the wheel 12 as aforesaid. As the board is moved laterally the wheel 12 will be caused to rotate and to carry with it an abundant supply of glue in the cups 16 for gluing around and between the projections of the dovetail.

While I have shown a particular form of embodiment of my invention I am aware that many minor changes will suggest themselves to others skilled in the art without departing from the spirit and scope of the invention. Having thus described the invention, what I claim as new and desire to protect by Letters Patent is:

1. A gluing device comprising a steam chamber supporting a water receptacle, a glue pot disposed within the water receptacle and adapted to be heated thereby, a slotted coverplate for the glue pot having a plurality of spaced apart glue applying wheels rotatably mounted thereon and in contact with the glue in the pot, one of said wheels having a smooth periphery and being of greater diameter than that of the other of said wheels, the other of said wheels having a plurality of cup formations around its periphery and adapted to mesh with the dovetail edge of a piece of material.

2. A gluing device comprising a glue pot and a coverplate therefor, a pair of spaced apart glue applying wheels rotatably mounted on the coverplate and adapted to convey glue from the interior of the glue pot to the exterior thereof, one of said wheels having a smooth periphery and being of greater diameter than that of the other wheel, and the other of said wheels having a notched periphery for engagement with the dovetail edge of a piece of material.

3. A gluing device comprising a glue pot adapted to be heated by a water chamber, said glue pot and water chamber being supported by a steam chamber and adapted to be heated thereby, a pair of spaced apart glue applying wheels of different diameters rotatably immersed in the glue pot, one of said wheels having a smooth peripheral surface and the other of said wheels having a notched periphery for engagement with the dovetail edge of a piece of material, and means for retaining an amount of glue within said notches during rotation of the wheel.

4. In a steam and water heated gluing device, the combination of a glue pot, a pair of glue applying wheels rotatably mounted with respect to the glue pot and partially immersed in the glue in the pot, one of said wheels having a smooth peripheral surface, and the other of said wheels having teeth formed around its periphery for meshing with the dovetail edge of a piece of material whereby movement of the material will cause rotation of the wheel, a flange formed on the back face of said toothed wheel to form a back wall between said teeth whereby receptacles are formed between the teeth for conveying glue around the wheel during its rotation.

HARRY A. GREEN.